(12) United States Patent
Zang et al.

(10) Patent No.: US 11,360,696 B2
(45) Date of Patent: Jun. 14, 2022

(54) SYSTEM STARTUP METHOD AND APPARATUS, ELECTRONIC DEVICE, AND STORAGE MEDIUM

(71) Applicant: HUAWEI TECHNOLOGIES CO., LTD., Guangdong (CN)

(72) Inventors: Leizhen Zang, Beijing (CN); Chaozhu Tong, Dongguan (CN); Jun Xue, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 87 days.

(21) Appl. No.: 17/039,596

(22) Filed: Sep. 30, 2020

(65) Prior Publication Data

US 2021/0026555 A1    Jan. 28, 2021

Related U.S. Application Data

(63) Continuation of application No. PCT/CN2019/075599, filed on Feb. 20, 2019.

(30) Foreign Application Priority Data

Apr. 18, 2018    (CN) .......................... 201810351166.6

(51) Int. Cl.
   *G06F 3/06*   (2006.01)
   *G06F 9/4401*   (2018.01)
(52) U.S. Cl.
   CPC .......... *G06F 3/0655* (2013.01); *G06F 3/0604* (2013.01); *G06F 3/0679* (2013.01); *G06F 9/4401* (2013.01)

(58) Field of Classification Search
   None
   See application file for complete search history.

(56) References Cited

U.S. PATENT DOCUMENTS

| 5,388,267 A * | 2/1995 | Chan | ................... G06F 15/7814 714/36 |
| 6,560,703 B1 * | 5/2003 | Goodman | ............. G06F 9/4403 713/2 |

(Continued)

FOREIGN PATENT DOCUMENTS

| CN | 1698122 A | 11/2005 |
| CN | 101923448 A | 12/2010 |

(Continued)

*Primary Examiner* — Elias Mamo
(74) *Attorney, Agent, or Firm* — Womble Bond Dickinson (US) LLP

(57) ABSTRACT

This application describes a system startup method and apparatus. The method may include establishing a mapping relationship between address space of a first storage device and address space of a second storage device. The method may also include receiving a read/write request sent to the first storage device. Furthermore, the method may include when the read/write request is a write request for the first storage device, writing data to a second address in the second storage device based on a first address in the first storage device in the write request and the mapping relationship. Or, when the read/write request is a read request for the first storage device, determining whether data has been written to a fourth address corresponding to a third address in the read request. The method may further include reading data from the fourth address when the data has been written to the fourth address, or reading data from the third address when no data has been written to the fourth address.

20 Claims, 6 Drawing Sheets

(56) References Cited

U.S. PATENT DOCUMENTS

| | | | |
|---|---|---|---|
| 6,920,553 B1* | 7/2005 | Poisner | G06F 9/4401 |
| | | | 713/1 |
| 7,313,683 B2* | 12/2007 | Takahashi | H04L 67/34 |
| | | | 711/170 |
| 2005/0246518 A1* | 11/2005 | Takahashi | G06F 9/4416 |
| | | | 713/2 |
| 2011/0179219 A1 | 7/2011 | Ma et al. | |
| 2013/0268739 A1 | 10/2013 | Gupta et al. | |
| 2015/0006795 A1* | 1/2015 | Becker | G06F 9/45558 |
| | | | 711/103 |
| 2017/0277897 A1 | 9/2017 | Jang et al. | |

FOREIGN PATENT DOCUMENTS

| | | |
|---|---|---|
| CN | 102521013 A | 6/2012 |
| CN | 102662798 A | 9/2012 |
| CN | 103679039 A | 3/2014 |
| CN | 105868048 A | 8/2016 |
| CN | 108763099 A | 11/2018 |
| EP | 0686907 A2 | 12/1995 |
| EP | 1559018 A2 | 8/2005 |
| EP | 1705572 A1 | 9/2006 |
| WO | 0007106 A1 | 2/2000 |
| WO | 2004040578 A2 | 5/2004 |

* cited by examiner

SYSTEM STARTUP METHOD AND APPARATUS, ELECTRONIC DEVICE, AND STORAGE MEDIUM

CROSS-REFERENCE TO RELATED APPLICATIONS

This application is a continuation of International Application No. PCT/CN2019/075599, filed on Feb. 20, 2019, which claims priority to Chinese Patent Application No. 201810351166.6, filed on Apr. 18, 2018. The disclosures of the aforementioned applications are hereby incorporated by reference in their entireties.

TECHNICAL FIELD

Embodiments of this application relate to the field of communications technologies, and in particular, to a system startup method and apparatus, an electronic device, and a storage medium.

BACKGROUND

In an electronic device such as a smartphone, a television, or a tablet, an embedded multimedia card (eMMC)/a universal flash storage (UFS) memory is used as a storage device. A controller and a NAND flash storage are included inside the eMMC/the UFS.

Due to a technological structure, the NAND flash storage has a quantity of program-erase cycles (PE cycle). When a predetermined quantity of PE cycles is reached for the NAND flash storage, life of the NAND flash storage is exhausted, and programming or erasing cannot be performed any longer. In this case, the eMMC/UFS changes into read-only, or although data can be written, data accuracy cannot be ensured. Therefore, when the life of the NAND flash storage is exhausted, a system of the electronic device cannot be normally started. For a user of the electronic device, if the system cannot be normally started, the user is incapable of transferring important data of the user. In particular, if data such as an address book and a photo is lost, huge troubles are brought to life of the user. In the prior art, there are some solutions for this. However, a storage device often needs to be removed, and then user data is read by using a third-party device. The user data further needs to be further decrypted. It is difficult for a common user to perform these operations, and the user needs to seek help from a professional technician. This significantly impacts the user due to increases in time costs and money costs, and therefore negatively affects user experience.

SUMMARY

This application provides a system startup method and apparatus, an electronic device, and a storage medium, so that when a problem occurs in a storage device, a user can obtain, without performing a complex operation, an opportunity of transferring important user data, improving user experience.

According to a first aspect, an embodiment of this application provides a system startup method, including:

establishing a mapping relationship between address space of a first storage device and address space of a second storage device if it is detected that data is incapable of being normally written to the first storage device or a preset instruction of a user is received;

receiving a read/write request sent to the first storage device, where the read/write request is used to obtain or store data required during system startup;

if the read/write request is a write request for the first storage device, writing data to a second address in the second storage device based on a first address in the first storage device in the write request and the mapping relationship; or if the read/write request is a read request for the first storage device, determining whether data has been written, in this startup process, to a fourth address corresponding to a third address in the read request; and reading data from the fourth address if determining that the data has been written to the fourth address in this startup process; or reading data from the third address if determining that no data has been written to the fourth address in this startup process.

In this embodiment of this application and embodiments mentioned in the following, the "establishing a mapping relationship between address space of a first storage device and address space of a second storage device" may be temporarily establishing a mapping relationship between the first address and the second address when writing to the first storage device is incapable of being performed. Alternatively, the mapping relationship between the first address and the second address may be preset, and then when writing to the first storage device is incapable of being performed, the mapping relationship is read from software or hardware and enabled. In other words, in this case, the establishing further includes a meaning of "enabling".

In the foregoing solution, the data required during system startup includes executable code, system data, user data, and the like.

In this solution, when the read/write request sent to the first storage device is received, if the read/write request is the write request for the first storage device, the write request is mapped to the second address in the second storage device, and the data is written to the second address. Therefore, the data can be normally written in a system startup process; and if the read/write request is the read request for the first storage device, the data is read from the fourth address when it is determined that the data has been written, in this startup process, to the fourth address in the second storage device corresponding to the third address in the read request; or the data is read from the third address when no data has been written to the fourth address. In this way, it is ensured that data in a storage device can be read in the system startup process. Because not only data can be normally written, but also correct data can be read, normal startup of the system can be ensured, and when a problem occurs in the storage device, the user can obtain, without performing a complex operation, an opportunity of transferring important user data, improving user experience.

In a possible embodiment, the method further includes:

establishing bitmap information, where the bitmap information is used to identify whether data has been written to addresses in the address space of the second storage device corresponding to the address space of the first storage device; and if data has been written to the fourth address in the second storage device, updating a value of a corresponding flag bit of the fourth address in the bitmap information; and the determining whether data has been written, in this startup process, to a fourth address corresponding to a third address in the read/write request includes:

determining, based on the corresponding flag bit of the fourth address in the bitmap information, whether the data has been written to the fourth address.

In the foregoing solution, during system startup, memory space is allocated in a block mapping device, and the bitmap information is established in the memory space. In an initial state, all flag bits in the bitmap information may be initialized to be all 0s or all 1s. The flag bits in the bitmap information are used to represent data write states that are of the addresses of the second storage device and that are caused by a mapping of the write request for the first storage device. When data is written to a fourth address in the second storage device, the block mapping device updates a value of a flag bit corresponding to the fourth address.

The bitmap information is used to identify whether the data has been written to the addresses in the address space of the second storage device corresponding to the address space of the first storage device. Therefore, the bitmap information may be used to quickly search for the second address in the read/write request and determine whether the data has been written to the second address. In this way, it may be quickly determined whether the data is read from the first storage device or from the second storage device, thereby improving data read efficiency.

In a possible embodiment, the first storage device includes a UFS or an eMMC.

In a possible embodiment, the second storage device includes a block device virtualized from a memory or an external storage device.

In this solution, the memory may be an on-chip random access memory, or certainly may be another storage device. For example, the second storage device may be alternatively a storage module formed by connecting the external storage device to an electronic device through an external interface, such as a universal serial bus (USB), provided that this is supported by the system.

In a possible embodiment, the first storage device is configured to store the data required during system startup.

In this solution, the data required during system startup includes executable code, system data, user data, and the like.

In a possible embodiment, a range of the address space of the second storage device is greater than or equal to a range of the address space of the first storage device.

In this solution, the range of the address space of the second storage device is greater than or equal to the range of the address space of the first storage device. In this way, the mapping relationship between the address space of the first storage device and the address space of the second storage device may be more easily established.

In a possible embodiment, the establishing a mapping relationship between address space of a first storage device and address space of a second storage device if it is detected that data is incapable of being normally written to the first storage device or a preset instruction of a user is received includes:

after a system is powered on, when a boot loader program or a kernel program or an initializer program runs, detecting whether the data is normally written to the first storage device or the preset instruction of the user is received; and establishing the mapping relationship between the address space of the first storage device and the address space of the second storage device if it is detected that the data is incapable of being normally written to the first storage device or the preset instruction of the user is received.

In a possible embodiment, that the data is incapable of being normally written to the first storage device includes: the first storage device is in a read-only state; and/or a user data partition file system is in a read-only state.

In the foregoing solution, by using a status register value that is of the NAND flash storage of the eMMC/UFS and that is read and stored in a system file sysfs during kernel startup, it may be determined whether the eMMC/UFS is in the read-only state. If the status register value represents that the NAND flash storage is read-only or abnormal, it indicates that the eMMC/UFS is in the read-only state, in other words, the data is incapable of being normally written to the first storage device. In addition, if the data is incapable of being normally written to the data partition file system or a read value is incorrect, the user data partition file system is in the read-only state, in other words, the data is incapable of being normally written to the first storage device.

In a possible embodiment, the method further includes:

starting a volume native service vold, another native service, a virtual machine, a system service, and a lock screen application based on the data;

receiving password, pattern, or fingerprint data entered by the user based on the lock screen application; and accessing the user data partition file system based on the password, pattern, or fingerprint data by using the volume native service vold, so that the user data in the system can be decrypted, the user data can be accessed to start up the system, and the system normally runs after the startup is completed.

In a possible embodiment, the method further includes:

during startup of a virtual machine and a system service, forbidding a package to be optimized and compiled.

In a possible embodiment, the method further includes:

outputting prompt information, where the prompt information is used to remind the user to back up the data.

According to a second aspect, an embodiment of this application provides a system startup apparatus, including:

a processing unit, configured to establish a mapping relationship between address space of a first storage device and address space of a second storage device when it is detected that data is incapable of being normally written to the first storage device or a preset instruction of a user is received, where the processing unit is configured to receive a read/write request sent to the first storage device, where the read/write request is used to obtain or store data required during system startup;

the processing unit is further configured to: when the read/write request is a write request for the first storage device, write data to a second address in the second storage device based on a first address in the first storage device in the write request and the mapping relationship;

the processing unit is further configured to: when the read/write request is a read request for the first storage device, determine whether data has been written, in this startup process, to a fourth address corresponding to a third address in the read request; and the processing unit is further configured to read data from the fourth address when determining that the data has been written to the fourth address in this startup process; or the processing unit is further configured to read data from the third address when determining that no data has been written to the fourth address in this startup process.

In a possible embodiment, the processing unit is specifically configured to:

establish bitmap information, where the bitmap information is used to identify whether data has been written to addresses in the address space of the second storage device corresponding to the address space of the first storage device; and if data has been written to the fourth address in the second storage device, update a value of a corresponding flag bit of the fourth address in the bitmap information; and the processing unit is further configured to:

determine, based on the corresponding flag bit of the fourth address in the bitmap information, whether the data has been written to the fourth address.

In a possible embodiment, the first storage device includes a UFS or an eMMC.

In a possible embodiment, the second storage device includes a block device virtualized from a memory or an external storage device.

In a possible embodiment, the first storage device is configured to store the data required during system startup.

In a possible embodiment, a range of the address space of the second storage device is greater than or equal to a range of the address space of the first storage device.

In a possible embodiment, the processing unit is specifically configured to:

after a system is powered on, when a boot loader program or a kernel program or an initializer program runs, detect whether the data is normally written to the first storage device or the preset instruction of the user is received; and establish the mapping relationship between the address space of the first storage device and the address space of the second storage device if it is detected that the data is incapable of being normally written to the first storage device or the preset instruction of the user is received.

In a possible embodiment, that the data is incapable of being normally written to the first storage device includes: the first storage device is in a read-only state; and/or a user data partition file system is in a read-only state.

In a possible embodiment, the processing unit is specifically configured to:

start a volume native service vold, another native service, a virtual machine, a system service, and a lock screen application based on the data;

receive password, pattern, or fingerprint data entered by the user based on the lock screen application; and access the user data partition file system based on the password, pattern, or fingerprint data by using the volume native service vold, so that the user data in the system can be decrypted, the user data can be accessed to start up the system, and the system normally runs after the startup is completed.

In a possible embodiment, the processing unit is further configured to: during startup of a virtual machine and a system service, forbid a package to be optimized and compiled.

In a possible embodiment, the processing unit is further configured to output prompt information, where the prompt information is used to remind the user to back up the data.

According to a third aspect, an embodiment of this application further provides an electronic device. The electronic device may include a processor, configured to: be coupled to an instruction memory, and execute an instruction in the instruction memory. The processor is configured to perform the following actions in a startup process of the electronic device according to the instruction:

establishing a mapping relationship between address space of a first storage device and address space of a second storage device if it is detected that data is incapable of being normally written to the first storage device or a preset instruction of a user is received;

receiving a read/write request sent to the first storage device, where the read/write request is used to obtain or store data required during system startup;

if the read/write request is a write request for the first storage device, writing data to a second address in the second storage device based on a first address in the first storage device in the write request and the mapping relationship; or if the read/write request is a read request for the first storage device, determining whether data has been written, in this startup process, to a fourth address corresponding to a third address in the read request; and reading data from the fourth address if determining that the data has been written to the fourth address in this startup process; or reading data from the third address if determining that no data has been written to the fourth address in this startup process.

In a possible embodiment, the processor is further configured to perform the following actions in the startup process of the electronic device according to the instruction:

establishing bitmap information, where the bitmap information is used to identify whether data has been written to addresses in the address space of the second storage device corresponding to the address space of the first storage device; and if data has been written to the fourth address in the second storage device, updating a value of a corresponding flag bit of the fourth address in the bitmap information; and the determining whether data has been written, in this startup process, to a fourth address corresponding to a third address in the read/write request includes:

determining, based on the corresponding flag bit of the fourth address in the bitmap information, whether the data has been written to the fourth address.

In a possible embodiment, the first storage device includes a UFS or an eMMC.

In a possible embodiment, the second storage device includes a block device virtualized from a memory or an external storage device.

In a possible embodiment, the first storage device is configured to store the data required during system startup.

In a possible embodiment, a range of the address space of the second storage device is greater than or equal to a range of the address space of the first storage device.

In a possible embodiment, the processor is further configured to perform the following actions in the startup process of the electronic device according to the instruction:

after a system is powered on, when a boot loader program or a kernel program or an initializer program runs, detecting whether the data is normally written to the first storage device or the preset instruction of the user is received; and establishing the mapping relationship between the address space of the first storage device and the address space of the second storage device if it is detected that the data is incapable of being normally written to the first storage device or the preset instruction of the user is received.

In a possible embodiment, that the data is incapable of being normally written to the first storage device includes: the first storage device is in a read-only state; and/or a user data partition file system is in a read-only state.

According to a fourth aspect, an embodiment of this application further provides a readable storage medium, storing an instruction, where the instruction is used to instruct the electronic device to perform, in a startup process, the system startup method according to any embodiment of the first aspect.

According to a fifth aspect, an embodiment of this application further provides a computer program product including an instruction. When the computer program product runs on a computer, the computer performs the system startup method provided in the first aspect of the embodiments of this application.

According to a sixth aspect, an embodiment of this application further provides a chip. The chip stores a computer program, and the computer program is executed by a processor, to perform the system startup method provided in the first aspect.

In the foregoing aspects, an address in the first storage device and an address in the second storage device that are mentioned in the embodiments of this application may be block addresses.

In the foregoing aspects, the method and the startup apparatus provided in the embodiments of the present invention may be applied to a physical product, including a chip, a terminal product, a server device, or the like. The physical product has a function of implementing the system startup method in the foregoing aspects or any possible manner thereof. The function may be implemented by hardware, or may be implemented by hardware executing corresponding software. The hardware or the software includes one or more units corresponding to the foregoing function. The electronic device mentioned in the foregoing aspects may be a physical product such as a chip, a terminal product, or a server device, or may be a functional module or a functional module set that provides a corresponding function in the physical product. According to the method and the system startup apparatus, the electronic device, and the storage medium that are provided in this application, when the data is incapable of being written to the first storage device, the data that originally needs to be written to the first storage device is written to the second storage device in a mapping manner, satisfying a requirement of the system startup. For the user, when the writing is incapable of being performed on the first storage, the system can still be normally started, so that the user can directly transfer the user data by using the system of the electronic device, ensuring user experience.

DESCRIPTION OF EMBODIMENTS

Figure 1:
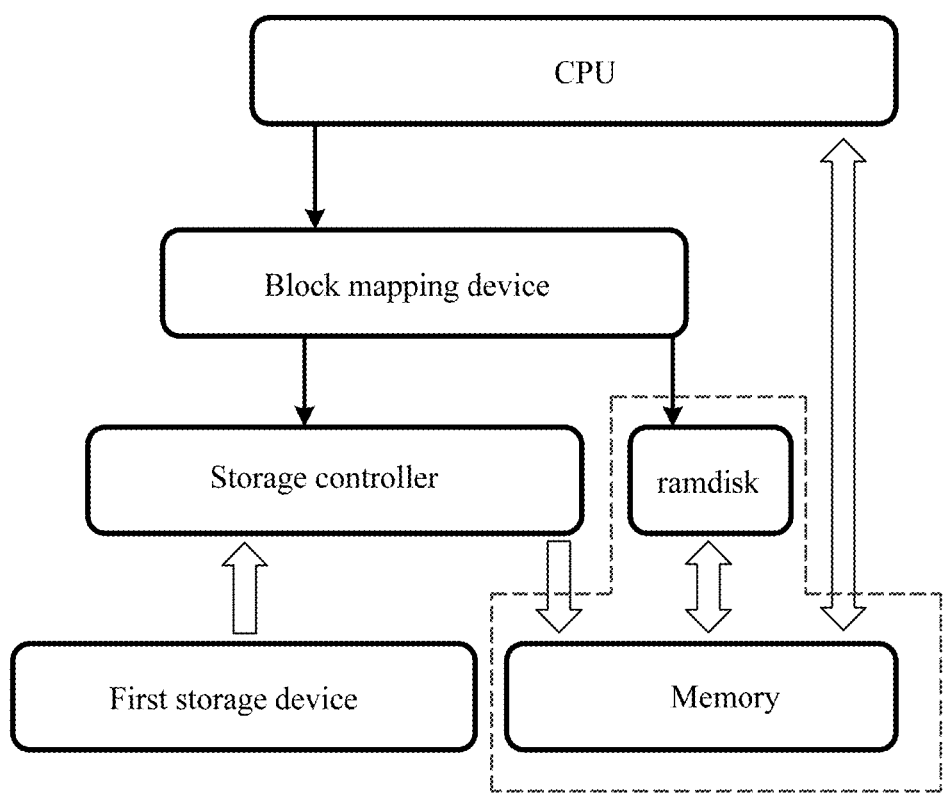
FIG. 1 is a schematic diagram of a system of an electronic device according to an embodiment of this application.

In the following, some terms in this application are described, to help persons skilled in the art have a better understanding.

Embodiments of this application provide descriptions by using a Linux™ kernel-based Android™ system as an example, but implementation of embodiments discussed herein are not limited to the Android™ system or a Linux™ kernel. A method in the embodiments of the present invention may be used for any system that is incapable of being normally started because a storage becomes invalid.

In the Linux™ kernel-based Android™ system:

1) A storage device is usually a block device, and the block device includes a physical device and a data structure (a block device structure) corresponding to the physical device in an operating system. It should be noted that, the block device in this application includes but is not limited to an Android™ block device or a Linux™ block device. The block device may be alternatively a block device in another system.

(2) Block mapping device: The block mapping device is a block device that redirects and maps a read/write request between different block devices in an operating system. In Linux™, the block mapping device is implemented as a subtype of a Device-Mapper device class. Device-Mapper is a generic device mapping mechanism supporting logical volume management in the Linux™ kernel, and provides a highly modularized kernel architecture to implement a block device driver used for storage resource management. By using a modularized target driver plug-in, Device-Mapper implements, in the kernel, a function such as filtering or redirecting an input/output (I/O) request of the block device.

A system startup method provided in the embodiments of this application may be applied to an electronic device, such as a smartphone, a television, a tablet, or an in-vehicle intelligent terminal, and in particular, applied to an application scenario of how to normally start up a system when data is incapable of being normally written (e.g., cannot be written using the usual, typical, and/or standard procedure (s)) to an internal storage device of the electronic device. In the prior art, due to a technological structure, an internal storage device of an electronic device has a quantity of program-erase cycles. When a predetermined quantity of program-erase cycles is reached for the internal storage device, life of the internal storage device is exhausted, and programming or erasing cannot be performed any longer. In this case, the internal storage device changes into read-only, or although data can be written, data accuracy cannot be ensured. Consequently, a system of the electronic device cannot be normally started, and a user is incapable of entering the system, causing a loss of user data. As discussed herein, normally started, normally written, and the like describe a condition of a system where the system can be started, data can be written, etc. using usual and/or standard procedure(s) (e.g., there is no departure from the norm). Thus, when data is incapable of being normally written, a system of the electronic device cannot be normally started, and the like refers to the inability to utilize the usual and/or standard procedures during startup, as discussed in greater detail herein.

In the Android™ system, there are two main reasons why the user is incapable of entering the system: (1) The first user-mode process init after kernel Linux™ of the Android™ system is started starts many system native services. When a native service writes data, because writing to the storage device fails, a file system detects an error code, causing the system to be restarted; or the native service quits because a writing failure error code is detected, and the system is restarted because the system cannot be normally started; or a logical error occurs because the native service reads incorrect data that is written, causing the native service to quit abnormally, and causing the system to be restarted. (2) Currently, an encryption manner of file-based encryption (FBE) is usually used for a user data partition of an Android™ device. When the user does not enter a screen unlock password, pattern, or fingerprint, a volume service vold (one of the native services) can only enable system device data to be decrypted, but is incapable of enabling the user data to be decrypted.

For the foregoing two problems, (1) although tmpfs may be mounted to a /data directory, so that the system native service writes data to start up the system, but consequently making a decryption-related service vold and a module e4crypt incapable of accessing a key and data that are located in an original userdata partition; (2) due to data security, when the user does not unlock a screen, the user data is incapable of being decrypted, because a screen lock password, pattern, or fingerprint of the user is used in generation and access of an encryption key of the user data. Therefore, when the internal storage device of the electronic device changes to a read-only state, or the user data partition file system is in a read-only state, how to enable the system to be normally started to ensure that the user data is not lost is a problem that needs to be resolved.

Considering this case, an embodiment of this application provides a system startup method. FIG. 1 is a schematic diagram of a system of an electronic device according to an embodiment of this application. The system includes a central processing unit (CPU), a storage controller, a first storage device, and a memory. The first storage device is configured to store data required during system startup, such as a program instruction and a parameter that is used when a program works, and is usually an eMMC or a UFS. The memory provides a cache for data that needs to be used during running of the CPU, and is usually various random-access memories (RAM). A double data rate synchronous dynamic random access memory (DDR SDRAM) is usually used on a current personal computer or a mobile terminal. The storage controller is configured to decode read/write requests sent by the central processing unit for the various storages. The storage controller may be an independent device that is separated from the first storage device and the memory as shown in FIG. 1, or may be integrated inside the first storage device or the memory, to specially manage a request for accessing a corresponding storage. An objective to be achieved in this embodiment of this application is: In a startup process, when the first storage device is abnormal or the first storage device is in a read-only state, the system can still be normally started.

Figure 2:
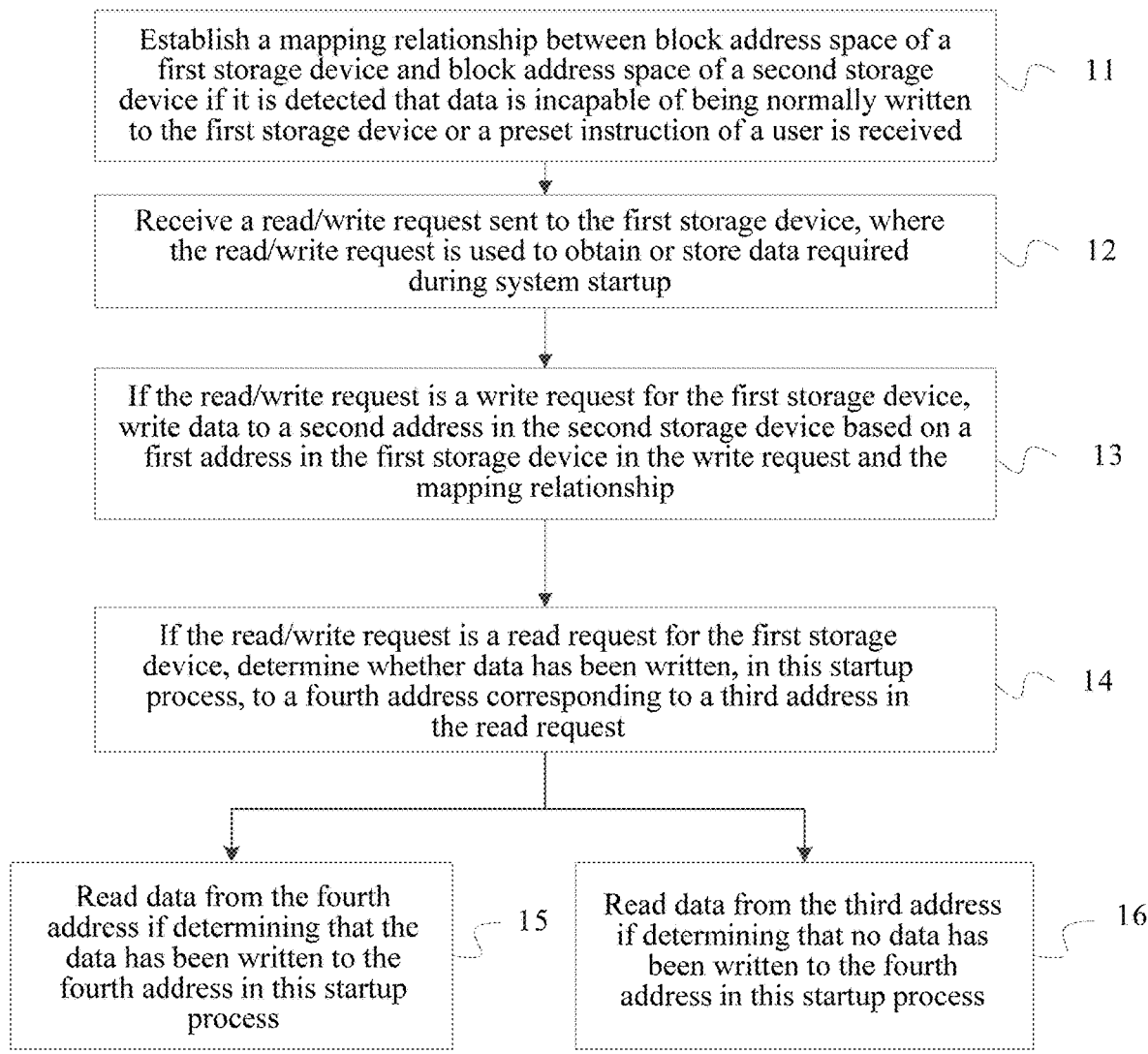
FIG. 2 is a schematic flowchart of a first Embodiment of a system startup method according to an embodiment of this application.

As shown in FIG. 2, an embodiment of this application provides a system startup method. The method may be performed by any apparatus for performing the system startup method. The apparatus may be implemented by using software and/or hardware. In this embodiment, the apparatus may be integrated in an electronic device. Based on the system of the electronic device shown in FIG. 1, as shown in FIG. 2, the method in this embodiment may include the following steps.

Step 11: Establish a mapping relationship between block address space of the first storage device and block address space of a second storage device if it is detected that data is incapable of being normally written to the first storage device or a preset instruction of a user is received.

In this embodiment, in a system startup process, during data reading/writing, the electronic device needs to access the first storage device, and read data from the first storage device or write data to the first storage device. Therefore, during system startup, a processor of the electronic device detects statuses of a storage device and the system. When detecting that the data is incapable of being normally written to the first storage device, or detecting that the preset instruction entered by the user is received, the processor establishes the mapping relationship between the block address space of the first storage device and the block address space of the second storage device.

The first storage device may be configured to store data required during the system startup. The data required during the system startup includes executable code, system data, user data, and the like. In a terminal device, a central processing unit is usually disposed in a processor chip, and the executable code, the system data, and the user data are usually stored in a storage outside the chip (namely, an off-chip storage). The off-chip storage is usually a UFS or an eMMC. Certainly, with development of technologies, another type of storage device may also be used as the first storage device.

In addition, the second storage device may be a block device, such as ramdisk, virtualized from the memory shown in FIG. 1.

In a possible manner, that the data is incapable of being normally written to the first storage device includes: the first storage device is in a read-only state; and/or a user data partition file system is in a read-only state.

Specifically, whether the eMMC/UFS is in the read-only state may be determined by using a status register value that is of a NAND flash storage of the eMMC/UFS and that is read and stored in a system file sysfs during kernel startup. If the status register value represents that the NAND flash storage is read-only or abnormal, it indicates that the eMMC/UFS is in the read-only state, in other words, the data is incapable of being normally written to the first storage device. In addition, if the data is incapable of being normally written to the data partition file system or a read value is incorrect, the user data partition file system is in the read-only state, in other words, the data is incapable of being normally written to the first storage device. In this case, the processor of the electronic device establishes the mapping relationship between the block address space of the first storage device and the block address space of the second storage device.

In addition, for a command line that is transmitted by a boot loader program to a kernel and that is stored in a device file system devfs by the kernel, a parameter in the command line indicates that the preset instruction of the user is received. In this case, the processor of the electronic device also establishes the mapping relationship between the block address space of the first storage device and the block address space of the second storage device. The preset instruction of the user may include an instruction triggered by the user by pressing a physical key or a combination of a plurality of physical keys, or may include an instruction triggered by the user in a manner such as touching a screen to draw a preset graph or letter, or may certainly include an instruction triggered by the user in a voice manner, or the like. A specific manner of triggering the preset instruction of the user is not limited in this embodiment of this application.

In addition, this embodiment of this application provides a startup method, to resolve a problem that a storage becomes invalid, making the system incapable of being started up. However, in an actual product use process, use of the startup method in this application enables the second storage device to be used as a substitute write target of the first storage device. This brings a result: No user operation after the system is started up leaves a trace on the first storage device. In other words, data on the first storage device is incapable of being tampered with. This is equivalent to causing the system to enter a "state self-clearance" state, a trace of a user operation is cleared after the system is shut down again. In this way, a first storage device can be protected from a "dangerous operation" of the user. In a possible application environment in the future, this application in which startup is performed by using the preset instruction actively initiated by the user has a realistic meaning.

Further, in this embodiment of the present invention, when writing is incapable of being performed on the first storage device, the second storage device is used as a substitute device of the first storage device to store data. The second storage device may be various storage devices different from the first storage device, such as a block device virtualized from a memory or an external storage device. The block device virtualized from the memory is a block device simulated by using the memory.

For example, the memory may include an on-chip random access memory (RAM) or a low-power double data rate (LPDDR) synchronous dynamic random access memory, or may certainly be another memory. In addition, in a possible embodiment, the second storage device may be alternatively a storage module formed by connecting the external storage device to an electronic device through an external interface, such as a universal serial bus (USB), provided that this is supported in the system.

In a possible embodiment, when the second storage device is a block device, such as ramdisk, virtualized from the memory, when detecting that the data is incapable of being normally written to the first storage device, or receiving the preset instruction of the user, a process init in the Android™ system creates a second storage device by using the kernel. A range of created block address space of the second storage device is greater than or equal to a range of the block address space of the first storage device.

Optionally, when the second storage device is a block device ramdisk of the memory, the second storage device may be a device instance whose device name is "ramdisk" in a Linux™ kernel, and correspond to a device driver "brd". In addition, a memory page is really allocated only when data is written to the second storage device, and the device driver "brd" manages the memory page by using a radix tree. Therefore, the page is sparse, and memory does not need to be continuously allocated to the entire block address space. Therefore, the memory of the system is not exhausted, and an amount of really occupied memory is a quantity of memory pages on which writing is actually performed.

When the second storage device includes the external storage device, the external storage device may include an external SD card, a storage device connected by using a universal serial bus (USB), or the like.

Persons skilled in the art may understand that, init is a first process that runs after the Linux™ kernel is started, and first runs in a kernel mode and then is switched to a user mode for running. In this embodiment of this application, init is a process that runs in the user mode.

In a possible embodiment, after the system is powered on, when a boot loader program or a kernel program or an initializer program runs, the electronic device detects whether the data can be normally written to the first storage device or the preset instruction of the user is received. If detecting that the data is incapable of being normally written to the first storage device or the preset instruction of the user is received, the electronic device establishes the mapping relationship between the block address space of the first storage device and the block address space of the second storage device.

In addition, it may be understood that, if it is detected that the data can be normally written to the first storage device or the preset instruction of the user is not received, the system is started up in an existing manner.

Step 12: Receive a read/write request sent to the first storage device, where the read/write request is used to obtain or store data required during system startup.

In this step, in the system startup process, the processor of the electronic device sends the read/write request. After receiving the read/write request, a redirection logical module determines, based on a device identifier of a target device carried in the read/write request, a storage device to which the read/write request is sent. After determining that the read/write request is sent to the first storage device, the redirection logical module redirects the read/write request to a block mapping device. The read/write request is used to obtain or store the data required during the system startup. The data required during the system startup may include executable code, system data, user data, and the like. In addition, the read/write request further carries the device identifier and address information of the target device for data reading/writing, and a cache for data that needs to be read/written.

Step 13: If the read/write request is a write request for the first storage device, write data to a second address in the second storage device based on a first address in the first storage device in the write request and the mapping relationship.

In this step, after the read/write request sent to the first storage device is received, that the read/write request is the write request for the first storage device is determined based on a read/write type field in the read/write request. Because the data is incapable of being normally written to the first storage device, the write request needs to be redirected. In a specific embodiment of an implementation process, for example, the write request includes the first address in the first storage device. Then, the write request is mapped to the second address in the second storage device based on the first address and the established mapping relationship by using at least one block mapping device (namely, device-mapper (DM)), and the data is written to the second address in the second storage device.

For example, if a block address 10, a block address 20, a block address 30, and a block address 40 in the first storage device respectively have mapping relationships with a block address 15, a block address 25, a block address 35, and a block address 45 in the second storage device, if a write request for the first storage device is received and a first address in the write request is the block address 20, the write request is mapped to the block address 25 in the second storage device by using at least one block mapping device, and data is written to the block address 25.

In addition, in actual application, the process init needs to create a block mapping device by using the kernel, and load a mapping function table of the block mapping device. The block mapping device maps the write request for the first storage device to a corresponding address in the second storage device.

In this embodiment, the block mapping device is implemented as a subtype of a Device-Mapper device class. The mapping function table of the block mapping device instructs the block mapping device to clone the read/write request, split the read/write request into small read/write requests having page-size data blocks, and map the write request for the first storage device to the second storage device.

It should be noted that, when the second storage device is a block device virtualized from the memory, the second storage device may be alternatively implemented in the block mapping device, and used as a functional submodule of the block mapping device, to implement a function of data writing/reading.

It should be noted that, if the second storage device is an external storage device, that the write request is mapped to the second address in the external storage device and the data is written to the second address may be that write request data of the block device is mapped to a specified storage location, a specified partition, or a specified file in the external storage device. In addition, to increase security, the data written to the external storage device usually needs to be encrypted. A function of the second storage device may be alternatively implemented in the following manner: During specific embodiments, the entire external storage device may be used as the second storage device, or a partition on the external storage device may be used as the second storage device, or a segment of address space on the external storage device may be specified as the second storage device, or a large file in a partition file system of the external storage may be used as a mapping target.

Step 14: If the read/write request is a read request for the first storage device, determine whether data has been written, in this startup process, to a fourth address corresponding to a third address in the read request.

If it is determined that the data has been written to the fourth address in this startup process, perform step 15. Otherwise, perform step 16.

In this step, after the read/write request sent to the first storage device is received, if it is determined that the read/write request is the read request for the first storage device, because data is written to the second storage device when the write request for the first storage device exists in the system startup process, it needs to be determined, during data reading, whether data has been written to the fourth address having a mapping relationship with the third address included in the read request.

In a possible embodiment, the processor of the electronic device determines, based on bitmap information established in the block mapping device, whether the data has been written to the fourth address. The bitmap information is used to identify whether data has been written to addresses in the address space of the second storage device corresponding to the address space of the first storage device.

Specifically, during the system startup, memory space is allocated in the block mapping device, and the bitmap information is established in the memory space. In an initial state, flag bits in the bitmap information may be initialized to be all 0s or all 1s. The flag bits are respectively used to represent data write states that are of the addresses in the second storage device and that are caused by a mapping of the write request for the first storage device. When data is written to a fourth address in the second storage device, the block mapping device updates a value of a flag bit corresponding to the fourth address.

For example, if the second storage device includes an address 1 to an address 10, an initial value of the bitmap information may be "0000000000". The flag bits in the bitmap information are respectively used to represent data write states in the address 1 to the address 10. When a value of a flag bit is 0, it indicates that no data is written to a corresponding address. If data is written to the address 3 in the second storage device, the block mapping device updates the third flag bit in the bitmap information to 1, that is, the bitmap information is updated to "0010000000". It should be noted that, the initial value of the bitmap information may be alternatively "1111111111, and if data had been written to a fourth address in the second storage device, the block mapping device updates a value of a corresponding flag bit of the fourth address in the bitmap information from 1 to 0.

Further, when it is determined whether the data has been written, in this startup process, to the fourth address corresponding to the third address in the read/write request, it may be determined, based on the corresponding flag bit of the fourth address in the bitmap information, whether the data has been written to the fourth address.

Specifically, it may be determined, based on values of the flag bits in the bitmap information, whether the data has been written to the fourth address. For example, if the second storage device includes an address 1 to an address 10, and the bitmap information is "1010010001", if it is assumed that 0 represents that no data has been written to the fourth address in the second storage device, and 1 represents that data has been written to the fourth address in the second storage device, it may be determined, based on the bitmap information, that data has been written to the address 1, the address 3, the address 6, and the address 10.

In this embodiment, the bitmap information is used to identify whether the data has been written to the addresses in the address space of the second storage device corresponding to the address space of the first storage device. Therefore, the bitmap information may be used to quickly search for the fourth address in the read/write request and determine whether the data has been written to the fourth address. In this way, it may be quickly determined whether the data is read from the first storage device or from the second storage device, thereby improving data read efficiency.

Step 15: Read data from the fourth address if determining that the data has been written to the fourth address in this startup process.

In this step, if it is determined that the data has been written to the fourth address in the second storage device in this startup process, the data is read from the fourth address in the second storage device, to ensure accuracy of the read data.

In a possible embodiment, the data may be read from the fourth address by using at least one block mapping device.

Step 16: Read data from the third address if determining that no data has been written to the fourth address in this startup process.

In this step, if it is determined that no data has been written to the fourth address in the second storage device in this startup process, the data is read from the third address in the first storage device. In this way, reading without writing may be performed on the first storage device.

In a possible embodiment, the data is read from the first address by using at least one block mapping device. According to the foregoing steps, a read/write request sent by an upper-layer file system to the first storage device that is in a physical read-only state may be normally completed, so that the read/write request is transparent to the file system and an upper layer. In this way, when the first storage device is read-only, a data write operation can still be completed by using an original kernel data structure (e.g., a block device structure) corresponding to a magnetic disk or a partition, so that a success of data reading and writing by an application can be ensured, and the system continues to be started according to a normal procedure.

In the method, when the read/write request sent to the first storage device is received, if the read/write request is the write request for the first storage device, the write request is mapped to the second address in the second storage device, to write data to the second address. Therefore, it is ensured that the data can be normally written in the system startup process; and if the read/write request is the read request for the first storage device, the data is read from the second address when it is determined that the data has been written to the second address; or the data is read from the first address if no data has been written to the second address. In this way, it is ensured that data in a storage device can be read in the system startup process, and the system can successfully write the data. Because not only the data, including decrypted data, in the storage device can be read, but also data can be normally written and correctly read, so that normal startup of the system can be ensured, and the user can transfer data by simply using the system of the electronic device, ensuring user experience.

Based on a structure of the system of the electronic device shown in FIG. 1, the following describes in detail the data reading and writing process shown in FIG. 2.

Figure 3:
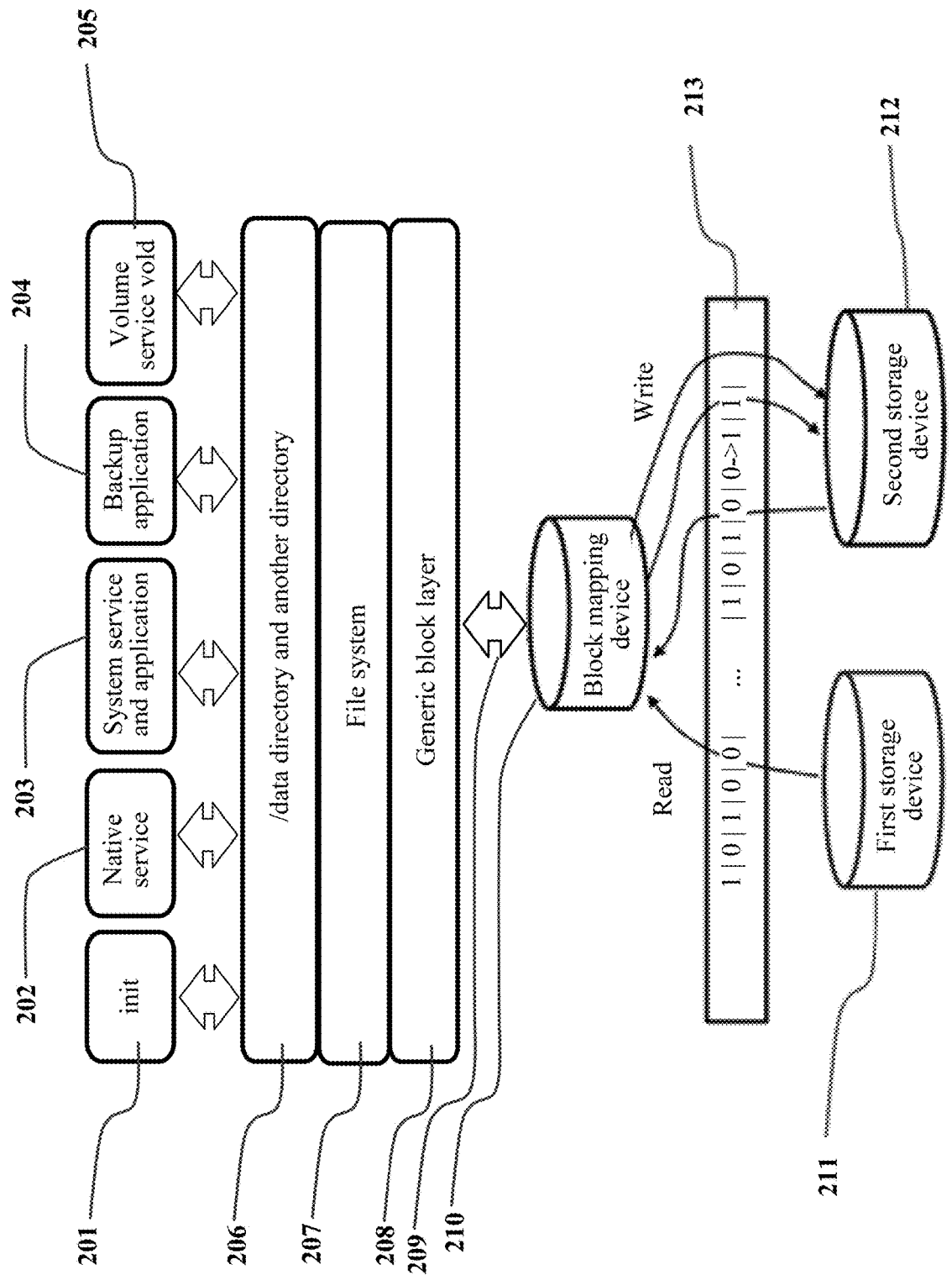
FIG. 3 is a schematic modular diagram of a system in a system startup process.

FIG. 3 is a schematic modular diagram of a system in a system startup process. As shown in FIG. 3, during startup of the electronic device, the electronic device creates a block mapping device (e.g., a device-mapper (DM)) and a second storage device. Main modules of the system include a process init 201, a native service 202, a system service and application 203, an emergency backup application 204, a volume native service vold 205, a system directory 206, a file system 207, a generic block layer 208, a bio redirection logical module 209, a block mapping device 210, a first storage device 211, a second storage device 212, and bitmap information 213. The modules may be used in the system startup process.

The process init 201 is the first user-mode process after the kernel of the Android™ system is started. The block mapping device 210 is a virtualized software module, and is executed by a processor, such as a central processing unit (CPU). The block mapping device 210 includes the bio redirection logical module 209 and the bitmap information 213. The bitmap information 213 is used to identify whether data has been written to addresses in address space of the second storage device 212 corresponding to address space of the first storage device 211. In other words, the bitmap information 213 is used to identify whether data has been written to the addresses of the second storage device 212 because of a mapping of a write request for the first storage device 211.

The system directory 206 includes a /data directory, and also directories such as /system, /persist, and /cache. The /system directory is used to mount a system partition, and the system partition mainly stores an executable program of the system. The /persist directory is used to mount a persist partition, and the persist partition mainly stores a configuration parameter of the electronic device, and the like. The /cache directory is used to mount a cache partition, and the cache partition is mainly used to store cached data of the system or an application. The block mapping device 210, the first storage device 211, and the second storage device 212 are all block devices, have an equal ranking, and are not affiliated with each other. The first storage device 211 includes the UFS or the eMMC, and the second storage device includes the block device virtualized from the memory or the external storage device. The file system 207 accesses these block devices by using the generic block layer 208.

In addition, when a storage device is normal, data needs to be read from the first storage device 211, such as the eMMC or the UFS, in the system startup process. The read data includes executable code, software and hardware system information, a system configuration, and the like. In addition, data also needs to be written to the eMMC or the UFS. The written data mainly includes system startup status information, data of a system service and a user program, and the like.

During the system startup, binary code of the executable program is first read. A storage partition in which the executable program is located is read-only, a corresponding flag bit is 0, system data or user data in the memory needs to be used when the application runs, and the CPU cannot directly read/write data in the first storage device 211. Therefore, the data can be read only after being loaded to the memory, or the data is first written to the memory and then the data is written by a storage controller to the first storage device. Therefore, the block mapping device instructs the storage controller to read the data from the first storage device to the memory, and then the CPU executes a program in the memory.

When the storage controller is instructed to read data from the first storage device 211 or write data to the first storage device 211, a read/write request is first redirected to the block mapping device 210. Specifically, based on FIG. 3, if it is detected that the data is incapable of being normally written to the first storage device 211 or a preset instruction of the user is received, a mapping relationship between block address space of the first storage device 211 and block address space of the second storage device 212 is established, and the block mapping device 210 receives the read/write request sent to the first storage device 211. The read/write request is used to obtain or store the data required during the system startup. If the read/write request is a write request for the first storage device 211, in other words, when the CPU needs to write data to the first storage device, the write request is redirected and mapped to a second address in the second storage device 212 based on a first address in the first storage device 211 in the write request and the mapping relationship by using at least one block mapping device 210, thereby writing data to the second address. When the data is written to the second address, the block mapping device 210 modifies a value of a flag bit corresponding to the second address in the bitmap information 213, to indicate that the data has been written to the second address.

If the read/write request is a read request for the first storage device 211, in other words, when the CPU needs to read data from the first storage device 211, the block mapping device 210 checks whether a write operation has been initiated for a corresponding block address in this startup process. If the write operation has been initiated for the corresponding block address, the block mapping device 210 instructs to read data from a mapped address of the address in the second storage device 212. If no write operation has been initiated for the corresponding block address, the block mapping device 210 instructs the storage controller to read data from the block address in the first storage device 211 to the memory. Specifically, whether data has been written to a fourth address in the second storage device 212 may be determined by using a third address in the first storage device 211 in the read request in this startup process and a value of a corresponding flag bit in the bitmap information 213. If the data has been written to the fourth address in this startup process, data is read from the fourth address. If no data has been written to the fourth address in this startup process, data is read from the third address.

Further, the read/write request may be a bio structure or a request structure. The bio structure is a data structure for representing that the read/write request is dispatched from the file system 207 to the generic block layer 208, and the request structure is a data structure for describing a request queue from the generic block layer 208 to the block mapping device 210.

The bio structure is a data structure, in a Linux™ generic block layer, for describing a single I/O request, and records related information necessary for an input/output (input/output, I/O) request. The related information mainly includes whether the I/O request is a read request or a write request, a target block device of the I/O request, a data cache location of the I/O request, a first sector of a block device for the I/O request, and the like.

The request structure is used to describe an I/O request submitted to the block mapping device, and one request structure usually includes several bio structures having consecutive addresses.

In a possible embodiment, an example in which the read/write request is a bio structure is used, and a process of redirecting the read/write request to the block mapping device may be implemented by using the following pseudo code description:

```
if (bio->bi_bdev->bd_contains == dm->origin_bdev) {
bio->bi_bdev = dm->bdev;
    generic_make_request(bio);
}
```

In addition, a process of mapping the read/write request to the second address in the second storage device by using at least one block mapping device may be implemented by using the following pseudo code description:

```
chunk_t chunk = sector_to_chunk(bio->bi_iter.bi_sector);
redow_fix_bio_cieinfo(bio);
    if (test_bit(chunk, dm->wr_bitmap)) {
        bio->bi_bdev = dm->cow->bdev;
        return DM_MAPIO_REMAPPED;
    }
    if (bio_rw(bio) == WRITE) {
        set_bit(chunk, dm->wr_bitmap);
        bio->bi_bdev = dm->cow->bdev;
        return DM_MAPIO_REMAPPED;
    } else {
        bio->bi_bdev =dm->origin->bdev;
        dm->origin_mrfn(bdev_get_queue(bio->bi_bdev), bio);
        return DM_MAPIO_SUBMITTED;
    }
```

Further, the following separately describes in detail a process of mapping the write request to the second address in the second storage device when the read/write request is a bio structure or a request structure.

When the write request is a bio structure, still refer to FIG. 3. It should be noted that, in a Linux™ kernel, a request queue of the first storage device 211 is located in the generic block layer 208, and the file system 207 submits the bio structure to the first storage device 211 by using the generic block layer 208. The block mapping device 210 takes over an entry of the request queue of the first storage device 211, so that a new write request sent by the kernel to the first storage device 211 is redirected to the block mapping device 210. When the new bio structure arrives, the block mapping device 210 clones and splits the bio structure with data into page-size bio structures, and maps the write-type bio structures to the second address in the second storage device. In actual application, because 4 K is a page size of the memory and a smallest unit for a vast majority of access memories, the block mapping device 210 clones and splits the bio structure with data into a series of small 4 K bio structures. Each 4 K bio structure corresponds to one bit in the bitmap information, in other words, one bit in the bitmap information corresponds to one piece of block data having a 4 K granularity.

When the write request is a request structure, a driver of the second storage device supports the request structure and a related interface, and the block mapping device and the first storage device perform access by using the request structure and the interface. It should be noted that, in the Linux™ kernel, the file system 207 submits a request structure request to a request queue of a block device by using the generic block layer 208. The block mapping device 210 takes over a back-end interface of the request queue of the first storage device 211, and perform access by using the request structure. The back-end interface of the request queue may use a request_fn function or a multi-queue-operation-structure queue_fn function based on a queue type, so that the new write request sent by the kernel to the first storage device 211 is mapped to the second address in the second storage device.

It should be noted that, when the read/write request is a bio structure, whether blocks are aligned for a data sector of the bio structure is first checked, and whether the block mapping device is valid and activated is checked. If the blocks are aligned for the data sector of the bio structure, and the block mapping device is valid and activated, an REQ_FLUSH bio structure and an REQ_DISCARD bio structure are separately processed. An REQ_FLUSH bio structure request is directly redirected to the second storage device for processing. For an REQ_DISCARD bio structure request, a value of a corresponding flag bit in the bitmap information is set to 1, and the bio structure request is mapped to the second storage device for processing.

When the read/write request is a request structure, the processor of the electronic device checks whether blocks are aligned for a data sector of the request structure, and checks whether the block mapping device is valid and activated. If the blocks are aligned for the data sector of the request structure, and the block mapping device is valid and activated, an REQ_FLUSH request structure request and an REQ_DISCARD request structure request are separately processed. The REQ_FLUSH request structure request is directly redirected to the second storage device for processing. For the REQ_DISCARD request structure request, a value of a corresponding flag bit in the bitmap information is set to 1, and the request structure request is mapped to the second storage device for processing.

It should be noted that, for processing of the REQ_FLUSH and REQ_DISCARD bio structures or the request structure, when the second storage device is an external storage device, the bio structure or the request structure need to be mapped to the external storage device, and an internal controller of the external storage device perform further processing.

The following separately describes in detail a process of processing the read requests of the different structures when the read request is a bio structure or a request structure.

For the read request of the bio structure, if a value of a corresponding flag bit in the bitmap information is 1, the read request is mapped as reading of written data from the second storage device; or if a value of a corresponding flag bit in the bitmap information is 0, the read request is mapped as reading of original data from the first storage device.

When the read/write request is a request structure, if it is determined that all data blocks that need to be read by using the request structure are modified, that is, have been written to the second storage device, the request structure is mapped to the second storage device to read latest written data; if no data block that needs to be read by using the request structure is modified, that is, has been written to the second storage device, the request structure is mapped to the first storage device to read original data; if some data blocks that need to be read by using the request structure are modified, that is, some data that needs to be read has been written to the second storage device, and some data that needs to be read has not been written, the request structure is cloned and split, and sent to the first storage device, to read the data that has not been written, and read latest data of the modified blocks from the second storage device, that is, read data written to the second storage device.

In an embodiment, for the read request of the request structure, if values of corresponding flag bits, in the bitmap information, of data blocks of a second address corresponding to a first address in the read request are all 1s, it indicates that all data that needs to be read by using the entire read request is modified, and the read request is mapped to the second storage device to read written data; if values of corresponding flag bits in the bitmap information are all 0s, it indicates that no data that needs to be read by using the entire read request is modified, and the read request is mapped as reading of original data from the first storage device; if some values of corresponding flag bits in the bitmap information are 0 and some values of corresponding flag bits in the bitmap information are 1, the request of the request structure is cloned and split into request-structure sub-requests whose corresponding flag bits are all 0s and all 1s, and the request-structure sub-requests whose corresponding flag bits are all 0s are mapped to the first storage device to read original data, and the request-structure sub-requests whose corresponding flag bits are all 1s are mapped as reading of latest data of modified blocks from the second storage device.

It should be further noted that, the second storage device in this embodiment may not support the request structure and the interface thereof, and a request structure processing function is included inside the block mapping device as a sub-function, and is directly accessed by using a bio_vec structure array or a logic sector of the bio structure.

Optionally, after data read/write operations are performed, the process init 201 continues to be performed, and the volume native service vold 205, the native service 202, the virtual machine, and the system service and application 203 are successively started based on data that is read/written. After the system is normally started, prompt information may be output to the user by using the emergency backup application 204, to remind the user to back up the data.

Further, when there are at least two block mapping devices, the at least two block mapping devices respectively have correspondences with a plurality of first storage devices or a plurality of partitions of a first storage device, and have a correspondence with one or more second storage devices.

Figure 4:
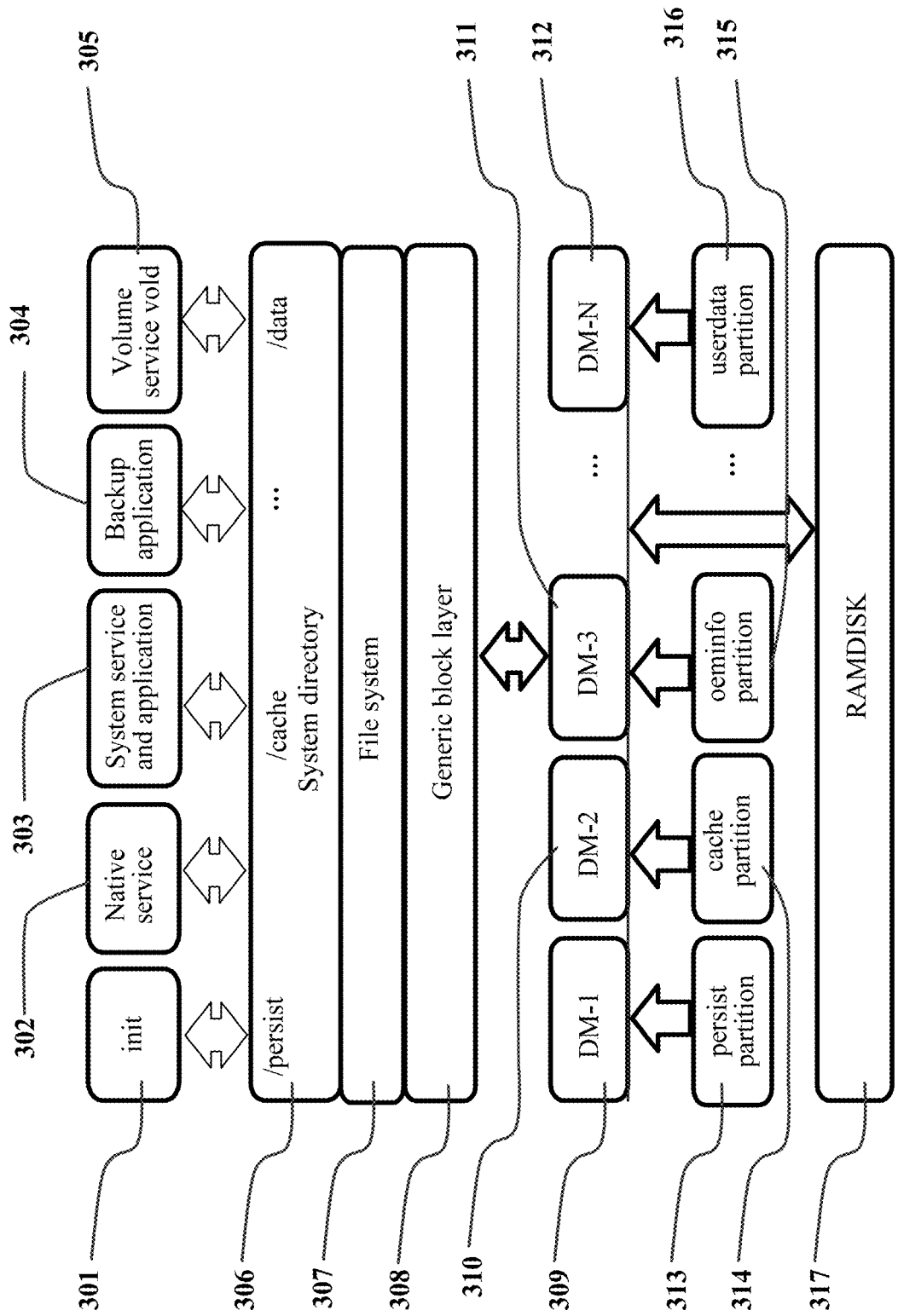
FIG. 4 is another schematic modular diagram of a system in a startup process.

Specifically, FIG. 4 is another schematic modular diagram of a system in a startup process. FIG. 4 is different from FIG. 3 in that, when there are at least two block mapping devices (for example, a DM-1, a DM-2, a DM-3, . . . , a DM-N in FIG. 4), the block mapping devices respectively have correspondences with a plurality of writable partitions in a first storage device. Specifically, during startup of the electronic device, main software modules of the system include a process init 301, a native service 302, a system service and application 303, an emergency backup application 304, a volume native service vold 305, a system directory 306, a file system 307, a generic block layer 308, a plurality of block mapping devices (block mapping device), where only four block mapping devices thereof are used as an example for description, respectively a block device DM-1 309, a block device DM-2 310, a block device DM-3 311, and a block device DM-N 312, and a plurality of writable partitions on a second storage device 317 and a first storage device (a NAND flash storage), where only four writable partitions thereof are used as an example for description, respectively a persist partition 313, a cache partition 314, an oeminfo partition 315, and a userdata partition 316.

During the system startup, the init 301 mounts a block mapping device to a corresponding item in the system directory 306. For example, the block device DM-1 309 is mounted to /persist, the block device DM-2 310 is mounted to /cache, the block device DM-3 311 is not mounted and is directly accessed in an original file system format by using a /dev/block/dm-3 device, and the block device DM-N is mounted to /data.

The block mapping devices correspond to the writable partitions of the first storage device of the system. For example, the block device DM-1 309 maps a read/write request to the persist partition 313 and the second storage device 317, the block device DM-3 311 maps a read/write request to the oeminfo partition 315 and the second storage device 317, and the block device DM-N 312 maps a read/write request to the userdata partition 316 and the second storage device 317.

It should be further noted that, a mapping manner in which the block mapping devices map the read/write request to the writable partitions of the first storage device and the second storage device 317 in this embodiment is similar to a manner of mapping a read/write request to a first storage device and a second storage device when there is only one block mapping device. A difference is that, during creation of each block mapping device, bitmap information is established inside each block mapping device, and each block mapping device maps, based on the bitmap information inside each block mapping device, the read/write request to the second storage device of the memory based on a linear address in a writable partition of the corresponding first storage device.

Specifically, the block device DM-3 311 is used as an example for description, and the read/write request is mapped to the oeminfo partition 315 and the second storage device 317. When the read/write request arrives, the block device DM-3 311 clones and split the read/write request with data into page-size read/write requests, maps the write requests to the second storage device 317, and maps the read requests to the second storage device 317 to read latest written data, or read original data from the oeminfo partition 315 of the first storage device, to perform reading without writing on the first storage device.

It may be understood that, after data is read/written, the electronic device starts a volume native service vold, another native service, a virtual machine, a system service, and a lock screen application based on the data, receives password, pattern, or fingerprint data entered by a user based on the lock screen application, and then accesses the user data partition file system based on the password, pattern, or fingerprint data by using the volume native service vold, so that the user data in the system can be decrypted, the user data can be accessed to start up the system, and the system normally runs after the startup is completed.

Specifically, after the data is read/written, the process init continues to be performed, partitions are mounted to a file system node, namely, the system directory, according to a normal procedure, and then the system native service is started based on an initialization script. The volume native service vold and a decryption module e4crypt first access the userdata partition of the system from the /data directory in the system directory according to the normal procedure, so that system and device data can be decrypted, and another native service may write or read data from the /data directory according to the normal procedure. In this way, the system may still be started according to the normal procedure, so that the device data can be decrypted, and the process init and a native service started by the process init can perform normal reading/writing and normally run.

Then, a Java virtual machine and a system service SystemServer continue to be started. It should be noted that, when data is incapable of being normally written to the first storage device, the system is instructed to forbid a package to be optimized and compiled, to reduce usage of the memory of the system.

Next, the system starts the lock screen application. The user enters the password, pattern, or fingerprint data by using the lock screen application. After receiving the password, pattern, or fingerprint data entered by the user by using the lock screen application, the electronic device accesses, according to the normal procedure, the user data partition file system again from the /data directory in the system directory based on the password, pattern, or fingerprint data by using the volume native service vold and the decryption module e4crypt, so that the user data in the system can be decrypted, the user data can be accessed to start up the system, and the system normally runs after the startup is completed. Because the system still runs according to the normal procedure after the user enters the password, pattern, or fingerprint data and unlocks a screen, the native service vold and the decryption module e4crypt that are related to decryption can still obtain, from the /data directory through decryption, the device and user data located in the user data partition.

Further, after the system is normally started, the electronic device outputs prompt information, and the prompt information is used to remind the user to back up the data.

Figure 5:
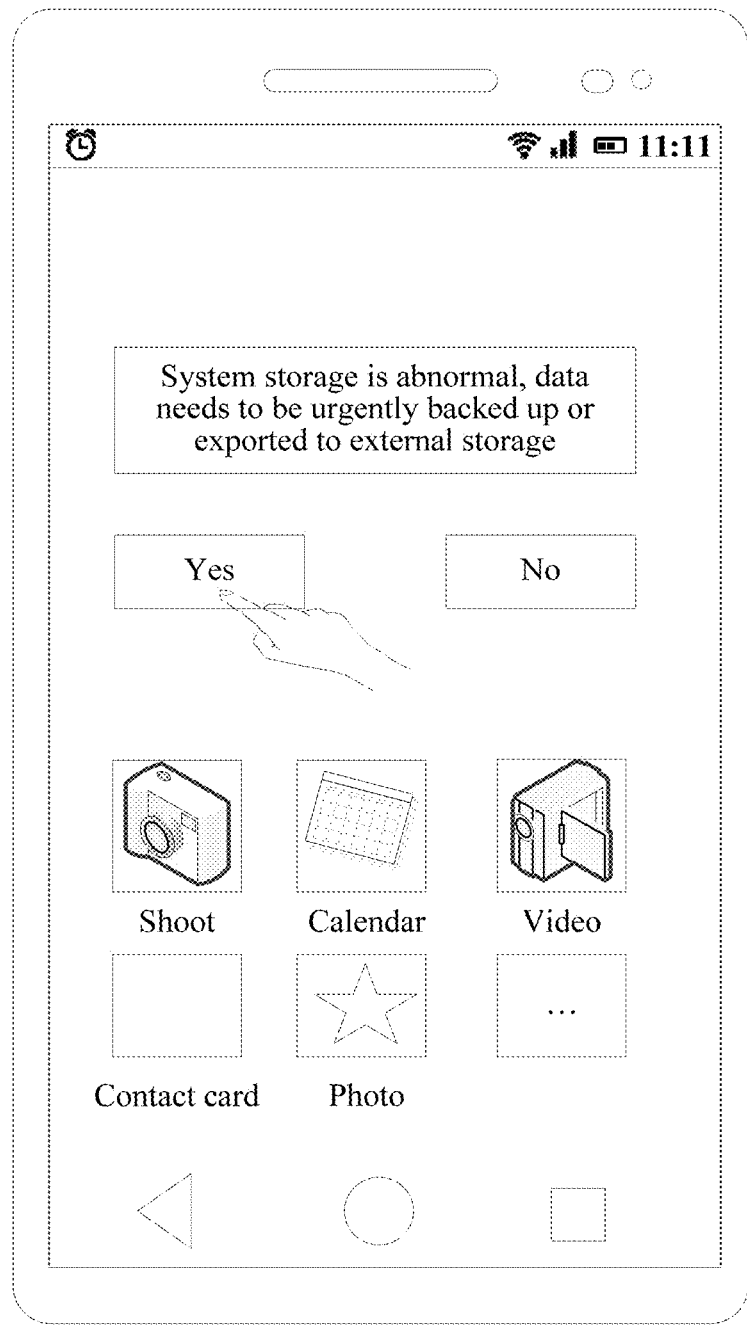
FIG. 5 is a schematic diagram of a prompt information interface.

Specifically, FIG. 5 is a schematic diagram of a prompt information interface. As shown in FIG. 5, to ensure that no user data is lost, after the system is normally started, the system detects and prepares an external storage device or reminds the user to prepare an external storage device, to remind the user that storage of the system is abnormal, and data needs to be urgently backed up or exported to external storage. As a first interface after screen unlock, the emergency backup application reminds the user to back up the data. In this way, the user operates the emergency backup application based on a requirement of the user, to export the data to the external storage device, to ensure that no data is lost.

It should be further noted that, the emergency backup application is implemented as a core application in the system. When the first storage device is normal, that is, when the system normally runs, the emergency backup application is invisible. The emergency backup application is started and runs only when data is incapable of being normally written to the first storage device or a preset instruction of the user is received. The emergency backup application aims at urgently exporting data when the data is incapable of being normally written to the first storage device, and further has the following features: (1) The emergency backup application does not back up the data to the first storage device, namely, the NAND flash storage or the eMMC, because the first storage device is already in an abnormal state; (2) The emergency backup application has a built-in system and user application management module, and has built-in functions of background running application management and memory cleaning, to ensure that the system has sufficient idle memory, and the emergency backup application is set with a priority higher than a priority of a common application.

In an optional embodiment, two manners, namely, a software manner and a hardware manner, may be used to implement many steps in this embodiment of this application, for example, the address mapping between the first storage device and the second storage device, the bitmap information management, and the determining based on various conditions, which are mentioned above. A solution implemented in the software manner can be simply implemented through programming. In terms of embodiments of implementation in the hardware manner, for example, when the bitmap information is initially established, storage space may be assigned in the memory, and then a start address and length information of the storage space are recorded in a length register and an address register inside hardware, so that during running, the hardware may directly obtain an address in the bitmap information from the address register and the length register, and access bitmap data, without using software for invocation. For the address mapping, one or more registers may be set for a first address, and values of the one or more registers may be combined to map a corresponding second address. The determining based on the conditions may be implemented by using a field programmable array (FPGA). In other words, the method in this embodiment of this application or a solution and an action feature of the apparatus device provided in the following may be completely implemented by using software, or may be separately implemented by using a hardware entity, or are implemented by using a combination of software and hardware.

According to the system startup method provided in this embodiment, the mapping relationship between the block address space of the first storage device and the block address space of the second storage device is established when it is detected that the data is incapable of being normally written to the first storage device or the preset instruction of the user is received; the read/write request sent to the first storage device is received, where the read/write request is used to obtain or store the data required during the system startup; if the read/write request is the write request for the first storage device, the data is written to the second address in the second storage device based on the first address in the first storage device in the write request and the mapping relationship; or if the read/write request is the read request for the first storage device, it is determined whether the data has been written, in this startup process, to the fourth address corresponding to the third address in the read request; and the data is read from the fourth address if it is determined that the data has been written to the fourth address in this startup process; or the data is read from the third address if it is determined that no data has been written to the fourth address in this startup process. When the read/write request sent to the first storage device is received, if the read/write request is the write request for the first storage device, the write request is mapped to the second address in the second storage device, to write data to the second address. Therefore, the data can be normally written in the system startup process; and if the read/write request is the read request for the first storage device, the data is read from the fourth address when it is determined that the data has been written to the fourth address; or the data is read from the third address if no data has been written to the fourth address. In this way, it is ensured that the data in the storage device can be read in the system startup process, and the system can successfully write the data. Because not only the data, including the decrypted data, on the storage device can be read, but also the data can be normally written and correctly read, so that the normal startup of the system can be ensured, and the user can transfer the data by simply using the system of the electronic device, ensuring user experience.

It should be noted that, the system startup method in this application is not limited to the Android™ system or the Linux™ kernel, and the startup method is also applicable to another system.

To display the method shown in FIG. 3, this application further provides a system startup apparatus. The system startup apparatus may include:

a processing unit, configured to establish a mapping relationship between block address space of a first storage device and block address space of a second storage device when it is detected that data is incapable of being normally written to the first storage device or a preset instruction of a user is received.

The processing unit is further configured to receive a read/write request sent to the first storage device. The read/write request is used to obtain or store data required during system startup.

The processing unit is further configured to: when the read/write request is a write request for the first storage device, write data to a second address in the second storage device based on a first address in the first storage device in the write request and the mapping relationship.

The processing unit is further configured to: when the read/write request is a read request for the first storage device, determine whether data has been written, in this startup process, to a fourth address corresponding to a third address in the read request.

The processing unit is further configured to read data from the fourth address when determining that the data has been written to the fourth address in this startup process.

The processing unit is further configured to read data from the third address when determining that no data has been written to the fourth address in this startup process.

Optionally, the processing unit is specifically configured to:

establish bitmap information, where the bitmap information is used to identify whether data has been written to addresses in the address space of the second storage device corresponding to the address space of the first storage device; and if data has been written to the fourth address in the second storage device, update a value of a corresponding flag bit of the fourth address in the bitmap information.

The processing unit is further configured to:

determine, based on the corresponding flag bit of the fourth address in the bitmap information, whether the data has been written to the fourth address.

Optionally, the first storage device includes a UFS or an eMMC.

Optionally, the second storage device includes a block device virtualized from a memory or an external storage device.

Optionally, the first storage device is configured to store the data required during system startup.

Optionally, a range of the block address space of the second storage device is greater than or equal to a range of the block address space of the first storage device.

Optionally, when there are at least two block mapping devices, the block mapping devices respectively have correspondences with a plurality of writable partitions in the first storage device.

Optionally, the read/write request respectively includes a bio structure or a request structure.

Optionally, the processing unit is specifically configured to:

after a system is powered on, when a boot loader program or a kernel program or an initializer program runs, detect whether the data is normally written to the first storage device or the preset instruction of the user is received; and establish the mapping relationship between the block address space of the first storage device and the block address space of the second storage device if it is detected that the data is incapable of being normally written to the first storage device or the preset instruction of the user is received.

Optionally, that the data is incapable of being normally written to the first storage device includes: the first storage device is in a read-only state; and/or a user data partition file system is in a read-only state.

Optionally, the processing unit is specifically configured to:

start a volume native service vold, another native service, a virtual machine, a system service, and a lock screen application based on the data;

receive password, pattern, or fingerprint data entered by the user based on the lock screen application; and access the user data partition file system based on the password, pattern, or fingerprint data by using the volume native service vold.

Optionally, the processing unit is further configured to: during startup of a virtual machine and a system service, forbid a package to be optimized and compiled.

Optionally, the processing unit is further configured to output prompt information. The prompt information is used to remind the user to back up the data.

The system startup apparatus shown in this embodiment of this application can perform a technical solution of the system startup method shown in any one of the foregoing embodiments. Their implementation principles and beneficial effects are similar, and details are not described herein again.

It should be noted that, it should be understood that, the unit division of the apparatus is merely logical function division, and during actual implementation, all or some of the units may be integrated into a physical entity, or the units may be physically separate. In addition, all the units may be implemented in a form of software invoking a processing element, or may be implemented in a form of hardware; or some units may be implemented in a form of software invoking a processing element, and some units are implemented in a form of hardware. For example, the processing unit may be a processing element that is separately set, or may be implemented by being integrated into a chip of the electronic device, or may be alternatively stored in a memory of the electronic device in a program form, so that a processing element of the electronic device invokes and performs a function of the processing unit. Implementation of other units is similar. In addition, all or some of the units may be integrated together, or may be implemented independently. The processing element may be an integrated circuit and has a signal processing capability. In an implementation process, steps in the foregoing methods or the foregoing units can be implemented by using a hardware integrated logical circuit in the processing element, or by using instructions in a form of software.

The foregoing units may be configured as one or more integrated circuits for performing the foregoing method, for example, one or more application-specific integrated circuits (ASIC), one or more microprocessors (e.g., a digital signal processor), or one or more field programmable gate arrays (FPGA). For another example, when one of the foregoing units is implemented in a form of a processing element scheduling a program, the processing element may be a general purpose processor, for example, a central processing unit (CPU) or another processor that can invoke a program. For another example, these units may be integrated together and implemented in a system-on-a-chip (SOC) form.

Figure 6:
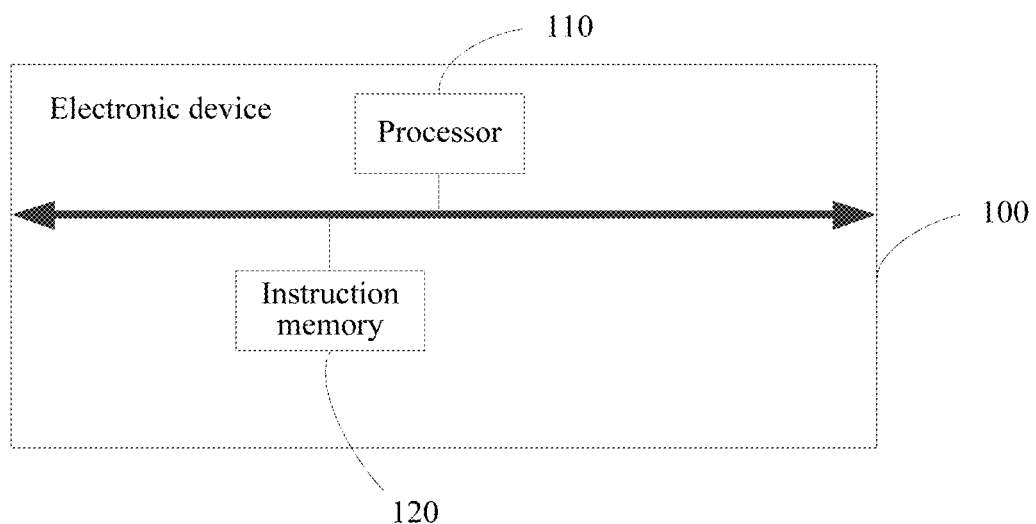
FIG. 6 is a schematic structural diagram of an electronic device according to an embodiment of this application.

FIG. 6 is a schematic structural diagram of an electronic device 100 according to an embodiment of this application. As shown in FIG. 6, the electronic device 100 includes a processor 110 and an instruction memory 120. The processor 110 is configured to: be coupled to the instruction memory 120, and execute an instruction in the instruction memory 120. The processor may be the CPU in FIG. 1, and the instruction memory may be the memory, or the like in FIG. 1.

The processor 110 is configured to perform the following actions in a startup process of the electronic device 100 according to the instruction:

establishing a mapping relationship between block address space of a first storage device and block address space of a second storage device if it is detected that data is incapable of being normally written to the first storage device or a preset instruction of a user is received;

receiving a read/write request sent to the first storage device, where the read/write request is used to obtain or store data required during system startup;

if the read/write request is a write request for the first storage device, writing data to a second address in the second storage device based on a first address in the first storage device in the write request and the mapping relationship; or if the read/write request is a read request for the first storage device, determining whether data has been written, in this startup process, to a fourth address corresponding to a third address in the read request; and reading data from the fourth address if determining that the data has been written to the fourth address in this startup process; or reading data from the third address if determining that no data has been written to the fourth address in this startup process.

Optionally, the processor is further configured to perform the following actions in the startup process of the electronic device according to the instruction:

establishing bitmap information, where the bitmap information is used to identify whether data has been written to addresses in the address space of the second storage device corresponding to the address space of the first storage device; and if data has been written to the fourth address in the second storage device, updating a value of a corresponding flag bit of the fourth address in the bitmap information; and the determining whether data has been written, in this startup process, to a fourth address corresponding to a third address in the read/write request includes:

determining, based on the corresponding flag bit of the fourth address in the bitmap information, whether the data has been written to the fourth address.

Optionally, the first storage device includes a universal flash storage UFS or an embedded multimedia card eMMC.

Optionally, the second storage device includes a block device virtualized from a memory or an external storage device.

Optionally, the first storage device is configured to store the data required during system startup.

Optionally, a range of the block address space of the second storage device is greater than or equal to a range of the block address space of the first storage device.

Optionally, when there are at least two block mapping devices, the block mapping devices respectively have correspondences with a plurality of writable partitions in the first storage device.

Optionally, the read/write request respectively includes a bio structure or a request structure.

Optionally, the processor is further configured to perform the following actions in the startup process of the electronic device according to the instruction:

after a system is powered on, when a boot loader program or a kernel program or an initializer program runs, detecting whether the data is normally written to the first storage device or the preset instruction of the user is received; and establishing the mapping relationship between the block address space of the first storage device and the block address space of the second storage device if it is detected that the data is incapable of being normally written to the first storage device or the preset instruction of the user is received.

Optionally, that the data is incapable of being normally written to the first storage device includes: the first storage device is in a read-only state; and/or a user data partition file system is in a read-only state.

Optionally, the processor 110 is further configured to perform the following actions in the startup process of the electronic device 100 according to the instruction:

starting a volume native service vold, another native service, a virtual machine, a system service, and a lock screen application based on the data;

receiving password, pattern, or fingerprint data entered by the user based on the lock screen application; and accessing the user data partition file system based on the password, pattern, or fingerprint data by using the volume native service vold.

Optionally, the processor 110 is further configured to perform the following action in a startup process of the electronic device 100 according to the instruction:

during startup of a virtual machine and a system service, forbidding a package to be optimized and compiled.

Optionally, the processor 110 is further configured to perform the following action:

outputting prompt information, where the prompt information is used to remind the user to back up the data.

In addition, all or some of the foregoing units may be alternatively implemented by being embedded in a chip of the electronic device in an integrated circuit form. They may be implemented independently, or may be integrated together. To be specific, the foregoing units may be configured as one or more integrated circuits for performing the foregoing method, for example, one or more application-specific integrated circuits (ASIC), one or more microprocessors (e.g., a digital signal processor), or one or more field programmable gate arrays (FPGA).

In an actual product, the second storage device may be a block device virtualized from a memory or an external storage device, and the instruction is usually written to the memory when being executed. In other words, in an actual product, the second storage device and the instruction memory may be located in a same hardware entity, that is, located in the memory. However, this does not cause a problem, because data needs to be written to the first storage device in the startup process, often few bytes are changed, and the data does not occupy excessive space even if the data is mapped to the memory. In addition, in this embodiment of this application, splitting the address space in the memory into the second storage device and the instruction memory is merely for the convenience of description, and the second storage device and the instruction memory may be located in the same hardware entity as described above, or may be located in different hardware entities. This should not constitute a limitation to implementation of this application.

In a selectable implementation solution, the instruction memory may be considered as a storage configured to store a computer program instruction, namely, a storage in which the program instruction is located before being written to the memory, namely, the first storage device. In other words, the instruction memory and the first storage device may be a unified entity. Although both the instruction memory and the first storage device are mentioned in this embodiment of this application, this is merely for the convenience of description in terms of application possibility, and that the instruction memory and the first storage device belong to a same entity does not cause persons skilled in the art not to clearly understand the technical solutions of this application.

This application further provides a readable storage medium, storing an instruction. The instruction is used to instruct the electronic device to perform the following actions in a startup process:

establishing a mapping relationship between block address space of a first storage device and block address space of a second storage device if it is detected that data is incapable of being normally written to the first storage device or a preset instruction of a user is received;

receiving a read/write request sent to the first storage device, where the read/write request is used to obtain or store data required during system startup;

if the read/write request is a write request for the first storage device, writing data to a second address in the second storage device based on a first address in the first storage device in the write request and the mapping relationship; or if the read/write request is a read request for the first storage device, determining whether data has been written, in this startup process, to a fourth address corresponding to a third address in the read request; and reading data from the fourth address if determining that the data has been written to the fourth address in this startup process; or reading data from the third address if determining that no data has been written to the fourth address in this startup process.

Optionally, the instruction is further used to instruct the electronic device to perform the following actions in the startup process:

establishing bitmap information, where the bitmap information is used to identify whether data has been written to addresses in the address space of the second storage device corresponding to the address space of the first storage device; and if data has been written to the fourth address in the second storage device, updating a value of a corresponding flag bit of the fourth address in the bitmap information; and the determining whether data has been written, in this startup process, to a fourth address corresponding to a third address in the read/write request includes:

determining, based on the corresponding flag bit of the fourth address in the bitmap information, whether the data has been written to the fourth address.

Optionally, the first storage device includes a UFS or an eMMC.

Optionally, the second storage device includes a block device virtualized from a memory or an external storage device.

Optionally, the first storage device is configured to store the data required during system startup.

Optionally, a range of the block address space of the second storage device is greater than or equal to a range of the block address space of the first storage device.

Optionally, when there are at least two block mapping devices, the block mapping devices respectively have correspondences with a plurality of writable partitions in the first storage device.

Optionally, the read/write request respectively includes a bio structure or a request structure.

Optionally, the instruction is further used to instruct the electronic device to perform the following actions in the startup process:

after a system is powered on, when a boot loader program or a kernel program or an initializer program runs, detecting whether the data is normally written to the first storage device or the preset instruction of the user is received; and establishing the mapping relationship between the block address space of the first storage device and the block address space of the second storage device if it is detected that the data is incapable of being normally written to the first storage device or the preset instruction of the user is received.

Optionally, that the data is incapable of being normally written to the first storage device includes: the first storage device is in a read-only state; and/or a user data partition file system is in a read-only state.

Optionally, the instruction is further used to instruct the electronic device to perform the following actions in the startup process:

starting a volume native service vold, another native service, a virtual machine, a system service, and a lock screen application based on the data;

receiving password, pattern, or fingerprint data entered by the user based on the lock screen application; and accessing the user data partition file system based on the password, pattern, or fingerprint data by using the volume native service vold.

Optionally, the instruction is further used to instruct the electronic device to perform the following action in the startup process:

during startup of a virtual machine and a system service, forbidding a package to be optimized and compiled.

Optionally, the instruction is further used to instruct the electronic device to perform the following action in the startup process:

outputting prompt information, where the prompt information is used to remind the user to back up the data.

This application further provides a program product, the program product includes a computer program (namely, an executable instruction), and the computer program is stored in a readable storage medium. At least one processor of an electronic device may read the computer program from the readable storage medium, and the at least one processor executes the computer program, so that the electronic device implements the system startup method provided in the foregoing various implementations.

An embodiment of this application further provides a system startup apparatus, and the apparatus includes at least one storage element and at least one processing element. The at least one storage element is configured to store a program, and when the program is executed, the system startup apparatus to perform an operation of the electronic device in any one of the foregoing embodiments.

All or some steps in the foregoing method embodiments may be completed by a program instructing related hardware. The foregoing program may be stored in a readable memory. When the program is executed, the steps in the foregoing method embodiments are performed. The memory (e.g., a storage medium) includes: a read-only memory (ROM), a random-access memory (RAM), a flash memory, a hard disk, a solid state disk, a magnetic tape, a floppy disk, an optical disc, and any combination thereof.

In the foregoing specification, the invention has been described in reference to specific exemplary embodiments thereof. It will, however, be evident that various modifications and changes may be made thereto without departing from the described spirit and scope of the invention. The specification and drawings are, accordingly, to be regarded as illustrative rather than a restrictive sense.

What is claimed is:

1. A system startup method, comprising:
    establishing a mapping relationship between address space of a first storage device and address space of a second storage device in response to detecting that data is incapable of being normally written to the first storage device or a preset instruction of a user is received;
    receiving a read/write request sent to the first storage device, wherein the read/write request obtains or stores data required during a system startup;
    when the read/write request is a write request for the first storage device, writing data to a second address in the second storage device based on a first address in the first storage device in the write request and the mapping relationship;
    when the read/write request is a read request for the first storage device, determining whether data has been written, during the system startup, to a fourth address corresponding to a third address in the read request; and
    reading data from the fourth address when determining that the data has been written to the fourth address during the system startup, or, reading data from the third address when determining that no data has been written to the fourth address during the system startup.

2. The method according to claim 1, wherein the method further comprises:
    establishing bitmap information, wherein the bitmap information identifies whether data has been written to addresses in the address space of the second storage device corresponding to the address space of the first storage device;
    when data has been written to the fourth address in the second storage device, updating a value of a corresponding flag bit of the fourth address in the bitmap information; and
    the determining whether data has been written, during the system startup, to the fourth address corresponding to the third address in the read/write request comprises:
    determining, based on the corresponding flag bit of the fourth address in the bitmap information, whether the data has been written to the fourth address.

3. The method according to claim 1, wherein the first storage device is configured to store the data used during the system startup.

4. The method according to claim 1, wherein a range of the address space of the second storage device is greater than or equal to a range of the address space of the first storage device.

5. The method according to claim 1, wherein the establishing the mapping relationship between the address space of the first storage device and the address space of the second storage device when it is detected that the data is incapable of being normally written to the first storage device or the preset instruction of the user is received comprises:
    after a system is powered on, when a boot loader program, a kernel program, or an initializer program runs, detecting whether the data is normally written to the first storage device or the preset instruction of the user is received; and
    establishing the mapping relationship between the address space of the first storage device and the address space of the second storage device when it is detected that the data is incapable of being normally written to the first storage device or the preset instruction of the user is received.

6. The method according to claim 1, wherein that the data is incapable of being normally written to the first storage device comprises: the first storage device is in a read-only state, a user data partition file system is in a read-only state, or a combination thereof.

7. The method according to claim 1, wherein the method further comprises:
    starting a volume native service vold, another native service, a virtual machine, a system service, and a lock screen application based on the data;
    receiving password, pattern, or fingerprint data entered by the user based on the lock screen application; and
    accessing a user data partition file system based on the password, pattern, or fingerprint data by using the volume native service vold.

8. The method according to claim 1, wherein the method further comprises:
    outputting prompt information that reminds the user to back up the data.

9. A system startup apparatus, comprising:
    a processing unit configured to establish a mapping relationship between address space of a first storage device and address space of a second storage device in response to detecting that data is incapable of being normally written to the first storage device or a preset instruction of a user is received, wherein
    the processing unit is configured to receive a read/write request sent to the first storage device, wherein the read/write request obtains or stores data required during system startup;
    the processing unit is further configured to: when the read/write request is a write request for the first storage device, write data to a second address in the second storage device based on a first address in the first storage device in the write request and the mapping relationship;
    the processing unit is further configured to: when the read/write request is a read request for the first storage device, determine whether data has been written, during the system startup, to a fourth address corresponding to a third address in the read request; and the processing unit is further configured to read data from the fourth address when determining that the data has been written to the fourth address during the system startup, or read data from the third address when determining that no data has been written to the fourth address during the system startup.

10. The apparatus according to claim 9, wherein the processing unit is further configured to:
establish bitmap information, wherein the bitmap information identifies whether data has been written to addresses in the address space of the second storage device corresponding to the address space of the first storage device; and
when data has been written to the fourth address in the second storage device, update a value of a corresponding flag bit of the fourth address in the bitmap information; and
the processing unit is further configured to:
determine, based on the corresponding flag bit of the fourth address in the bitmap information, whether the data has been written to the fourth address.

11. The apparatus according to claim 9, wherein the first storage device is configured to store the data used during the system startup.

12. The apparatus according to claim 9, wherein a range of the address space of the second storage device is greater than or equal to a range of the address space of the first storage device.

13. The apparatus according to claim 9, wherein the processing unit is further configured to:
after a system is powered on, when a boot loader program, a kernel program, or an initializer program runs, detect whether the data is normally written to the first storage device or the preset instruction of the user is received; and
establish the mapping relationship between the address space of the first storage device and the address space of the second storage device when it is detected that the data is incapable of being normally written to the first storage device or the preset instruction of the user is received.

14. The apparatus according to claim 9, wherein that the data is incapable of being normally written to the first storage device comprises: the first storage device is in a read-only state, a user data partition file system is in a read-only state, or a combination thereof.

15. The apparatus according to claim 9, wherein the processing unit is further configured to:
start a volume native service vold, another native service, a virtual machine, a system service, and a lock screen application based on the data;
receive password, pattern, or fingerprint data entered by the user based on the lock screen application; and
access a user data partition file system based on the password, pattern, or fingerprint data by using the volume native service vold.

16. The apparatus according to claim 9, wherein the processing unit is further configured to output prompt information that reminds the user to back up the data.

17. A non-transitory machine readable storage medium, having one or more instructions stored thereon, which when executed by a processor of an electronic device cause the processor to perform operations in a startup process of the electronic device, the operations comprising:
establishing a mapping relationship between address space of a first storage device and address space of a second storage device in response to detecting that data is incapable of being normally written to the first storage device or a preset instruction of a user is received;
receiving a read/write request sent to the first storage device, wherein the read/write request obtains or stores data required during a system startup;
when the read/write request is a write request for the first storage device, writing data to a second address in the second storage device based on a first address in the first storage device in the write request and the mapping relationship;
when the read/write request is a read request for the first storage device, determining whether data has been written, during the system startup, to a fourth address corresponding to a third address in the read request; and
reading data from the fourth address when determining that the data has been written to the fourth address during the system startup, or, reading data from the third address when determining that no data has been written to the fourth address during the system startup.

18. The non-transitory machine readable medium according to claim 17, further comprising the processor executing the one or more instructions to cause the processor to perform operations comprising:
establishing bitmap information, wherein the bitmap information identifies whether data has been written to addresses in the address space of the second storage device corresponding to the address space of the first storage device; and
when data has been written to the fourth address in the second storage device, updating a value of a corresponding flag bit of the fourth address in the bitmap information; and
the determining whether data has been written, during the system startup, to the fourth address corresponding to the third address in the read/write request comprises:
determining, based on the corresponding flag bit of the fourth address in the bitmap information, whether the data has been written to the fourth address.

19. The non-transitory machine readable medium according to claim 17, wherein the first storage device is configured to store the data used during the system startup.

20. The non-transitory machine readable medium according to claim 17, further comprising the processor executing the one or more instructions to cause the processor to perform operations comprising:
after a system is powered on, when a boot loader program, a kernel program, or an initializer program runs, detecting whether the data is normally written to the first storage device or the preset instruction of the user is received; and
establishing the mapping relationship between the address space of the first storage device and the address space of the second storage device when it is detected that the data is incapable of being normally written to the first storage device or the preset instruction of the user is received.

* * * * *